United States Patent
Proux

(10) Patent No.: US 9,639,601 B2
(45) Date of Patent: May 2, 2017

(54) QUESTION ANSWERING SYSTEM ADAPTED TO STYLE OF USER REQUESTS

(71) Applicant: Xerox Corporation, Norwalk, CT (US)

(72) Inventor: Denys Proux, Vif (FR)

(73) Assignee: XEROX CORPORATION, Norwalk, CT (US)

( * ) Notice: Subject to any disclaimer, the term of this patent is extended or adjusted under 35 U.S.C. 154(b) by 470 days.

(21) Appl. No.: 14/298,084

(22) Filed: Jun. 6, 2014

(65) Prior Publication Data

US 2015/0356142 A1    Dec. 10, 2015

(51) Int. Cl.

| | |
|---|---|
| G06F 17/00 | (2006.01) |
| G06F 17/20 | (2006.01) |
| G06F 17/30 | (2006.01) |
| G06F 9/44 | (2006.01) |
| G06N 5/02 | (2006.01) |
| G06N 5/04 | (2006.01) |
| G09B 7/04 | (2006.01) |
| G06N 99/00 | (2010.01) |

(52) U.S. Cl.
CPC .. *G06F 17/30663* (2013.01); *G06F 17/30675* (2013.01); *G06F 9/4446* (2013.01); *G06N 5/02* (2013.01); *G06N 5/04* (2013.01); *G06N 99/005* (2013.01); *G09B 7/04* (2013.01)

(58) Field of Classification Search
None
See application file for complete search history.

(56) References Cited

U.S. PATENT DOCUMENTS

| | | | |
|---|---|---|---|
| 6,263,335 B1 | 7/2001 | Paik et al. | |
| 6,311,152 B1 | 10/2001 | Bai et al. | |
| 6,975,766 B2 | 12/2005 | Fukushima | |
| 7,058,567 B2 | 6/2006 | Aït-Mokhtar et al. | |
| 7,171,350 B2 | 1/2007 | Lin et al. | |
| 2005/0065975 A1* | 3/2005 | McDonald | G06F 17/2705 |
| 2007/0005344 A1* | 1/2007 | Sandor | G06F 17/30705 704/9 |
| 2008/0319978 A1 | 12/2008 | Brun et al. | |

(Continued)

OTHER PUBLICATIONS

Aït-Mokhtar, S., et al., "Incremental Finite-State Parsing," Proc. 5th Conf. on Applied Natural Language Processing (ANLP'97), pp. 72-79 (1997).

(Continued)

*Primary Examiner* — Luis Sitiriche
*Assistant Examiner* — Ababacar Seck
(74) *Attorney, Agent, or Firm* — Fay Sharpe LLP

(57) ABSTRACT

A system and method provide for querying a knowledge base. The knowledge base includes a plurality of layers, each layer corresponding to a different type of information, such as user's intent, lack of knowledge, and specific issue. The system includes categorization rules for categorizing at least a part of a user's request according to the types of information and for mapping the request to respective layers of the knowledge base. The user's request is categorized with the categorization rules and mapped to one of the layers of the knowledge base, based on the categorization. A search is conducted for responsive problem descriptions among the problem descriptions in that layer. The system and method can thus provide for differential searching of the knowledge base, depending on the type of information being sought.

21 Claims, 3 Drawing Sheets

(56) References Cited

U.S. PATENT DOCUMENTS

| | | | |
|---|---|---|---|
| 2009/0150388 A1* | 6/2009 | Roseman | G06F 17/278 |
| 2009/0204596 A1 | 8/2009 | Brun et al. | |
| 2010/0082331 A1* | 4/2010 | Brun | G06F 17/2705 |
| | | | 704/9 |
| 2011/0282892 A1* | 11/2011 | Castellani | G06F 17/30389 |
| | | | 707/766 |
| 2012/0150920 A1 | 6/2012 | Roulland et al. | |
| 2012/0173562 A1* | 7/2012 | Zhu | G06F 17/3097 |
| | | | 707/767 |
| 2012/0192077 A1 | 7/2012 | Castellani et al. | |
| 2012/0245924 A1 | 9/2012 | Brun | |
| 2013/0096909 A1 | 4/2013 | Brun et al. | |
| 2013/0197899 A1 | 8/2013 | Roulland et al. | |

OTHER PUBLICATIONS

Aït-Mokhtar, S., et al., "Subject and Object Dependency Extraction Using Finite-State Transducers," Proc. 35th Conf. of the Association for Computational Linguistics (ACL'97) Workshop on Information Extraction and the Building of Lexical Semantic Resources for NLP Applications, pp. 71-77 (1997).

Aït-Mokhtar, S., et al., "Robustness beyond shallowness: incremental dependency parsing," in special issue of the NLE Journal, pp. 121-144 (2002).

Andrenucci, A., "Automated Question Answering: Review of the Main Approaches," Proc. $3^{rd}$. International Conf. on Information Technology and Applications, pp. 514-519 (Jul. 4-7, 2005).

Brun, C., et al., "A hybrid system for named entity metonymy resolution," Proc. $4^{th}$ International Workshop on Semantic Evaluations (SemEval-2007), Prague, pp. 488-491 (Jun. 2007).

Brun, C., "Detecting Opinions Using Deep Syntactic Analysis," Proc. Recent Advances in Natural Language Processing (RANLP), pp. 392-398 (Sep. 2011).

Brun, C., et al., "Normalization and paraphrasing using symbolic methods" ACL: Second International workshop on Paraphrasing, Paraphrase Acquisition and Applications, Sapporo, Japan, pp. 1-8 (2003).

Gavriel, M., Master of Science Thesis, University of Edinburgh, "Capturing negation in question answering systems," pp. 1-92 (2005), available at: https://www.era.lib.ed.ac.uk/handle.net/1842/2077.

Trouilleux, F., "Coreference Resolution Evaluation Based on Descriptive Specificity," Proc. $2^{nd}$ Intern'l Conf. on Language Resources and Evaluation (LREC 2000). Athens, Greece, pp. 1-8 (2000).

* cited by examiner

QUESTION ANSWERING SYSTEM ADAPTED TO STYLE OF USER REQUESTS

BACKGROUND

The exemplary embodiment relates to question answering (Q&A) systems and finds particular application in connection with a system and method for tailoring a Q&A system to find appropriate results for user requests.

Customer relation centers provide users with assistance when they face problems with a device or service, either by electronic communication or by telephone interaction with an agent. A knowledge base, which includes known solutions to problems that a user may face, may be accessed by the agent or the user to search for an answer to a user's request. Using human agents, however, is costly and thus attempts have been made to automate the process, where possible. Automated question answering systems offer a way to facilitate analysis of the content of requests submitted by end-users. They can provide several benefits, such as facilitating the identification of the problem or topic being discussed to help the agent find the most appropriated answer, automating part of the response and therefore reducing the task for the agent, and providing analysis of the interaction in order to improve future customer interactions and general customer satisfaction.

Customers and other end-users are often unfamiliar with the content and structure of the knowledge base and thus interaction with an automated system using natural language queries is often used. However, relevant answers are often not retrieved through such queries. This can be because the amount of information provided by the user in his request is not sufficient or because the nature of the information that is sought is unclear. For example, a request that results from a lack of knowledge by the user seeks different information from a request concerning a problem relating to a device malfunction.

Automated systems are generally based either on keyword matching or pattern matching. Several methods for improving searching inside a knowledge base to find the best match between a query and the most appropriate answer have been proposed. See, for example, Andrenucci, A., "Automated Question Answering: Review of the Main Approaches," Proc. 3rd Intern'l Conf. on Information Technology and Applications, pp. 514-519 (2005). Natural Language Processing (NLP) and machine learning have been used to learn how to recognize frequent types of questions. In pattern matching, the system looks for very specific combinations of words to trigger corresponding responses. Machine learning techniques use categorization models to find the best match between the words contained in a query and the typical vocabulary of previously learned classes of problems. One method is based on direct keyword matching, enhanced by the use of categorization algorithms to rank answers according to the frequency of the used vocabulary. Another approach uses machine learning to create clusters of queries related to a same answers in order to capture the typical vocabulary used to describe a given problem. Then, finding the category of questions allows the system to identify a related problem. Refinements to these approaches involve the use of synonyms or derivational morphology to enlarge the lexical scope of a query to increase the likelihood of finding a match with the content of the knowledge base.

Problems remain with these approaches. Pattern matching triggers rules or responses only when some specific sequence or combination of words is detected. As a result, a low recall can occur since it is not usually feasible to anticipate all possible queries. Machine learning can offer a higher recall as the mapping is often performed using a likelihood measure, but a drawback with this approach is a lack of real understanding of the meaning of the query. The words used and their frequency are taken into account but not their order and how they interact altogether. As an example, the following two queries with similar words may be placed in the same problem category even if the real meaning, as it relates to the underlying problem is not the same:

1. I cannot use Google maps after installing it.
2. I cannot install Google Maps and therefore am not able to use it.

In the first query, the problem relates to a lack of knowledge. The device may well be functioning correctly but the user lacks information on how to use it. In the second query, the problem may be related to the installation of the application. Thus, even if the user knows how to use the application, he cannot do so until the application is installed by the device. In such a case, standard systems based only on word frequency will suggest, among the possible solutions, some that are unlikely to solve the user's problem. This may cause frustration if it suggests that there is a lack of understanding of the user's needs and negatively impact the customer relationship.

There remains a need for a system and method capable of analyzing a user's request in order to create a differential search in the knowledge base.

INCORPORATION BY REFERENCE

The following references, the disclosures of which are incorporated herein by reference in their entireties, are mentioned:

The following relate to semantic analysis of text: U.S. Pub. No. 20120245924, published on Sep. 27, 2012, entitled CUSTOMER REVIEW AUTHORING ASSISTANT, by Caroline Brun; U.S. Pub. No. 20130096909, published Apr. 18, 2013, entitled SYSTEM AND METHOD FOR SUGGESTION MINING, by Caroline Brun, et al.

The following relate to knowledge base querying methods: U.S. Pub. No. 20110282892, published Nov. 17, 2011, entitled METHOD AND SYSTEM TO GUIDE FORMULATIONS OF QUESTIONS FOR DIGITAL INVESTIGATION ACTIVITIES, by Stefania Castellani, et al.; U.S. Pub. No. 20120150920, published Jun. 14, 2012, entitled METHOD AND SYSTEM FOR LINKING TEXTUAL CONCEPTS AND PHYSICAL CONCEPTS, by Frederic Roulland, et al; U.S. Pub. No. 20120192077, published Jul. 26, 2012, entitled MOBILE SCREEN METHODS AND SYSTEMS FOR COLLABORATIVE TROUBLESHOOTING OF A DEVICE, by Stefania Castellani, et al.; and U.S. Pub. No. 20130197899, published Aug. 1, 2013, entitled SYSTEM AND METHOD FOR CONTEXTUALIZING DEVICE OPERATING PROCEDURES, by Frederic Roulland, et al.

BRIEF DESCRIPTION

In accordance with one aspect of the exemplary embodiment, a method for querying a knowledge base includes providing a knowledge base which includes a plurality of layers, each layer corresponding to a different type of information. A question answering system is provided, which includes categorization rules for categorizing at least a part of a user's request according to the types of information and for mapping the request to the knowledge base. The mapping includes mapping to a first of the knowledge base layers when a first of the types of information is identified and mapping to a second of the knowledge base layers when a second of the types of information is identified. A user's request is received and at least a part of the user's request is categorized with the categorization rules. The user's request is mapped to one of the layers of the knowledge base, based on the categorization. The method further includes searching for responsive problem descriptions in the one of the layers.

One or more of the categorizing and the mapping of the user's request may be performed with a computer processor.

In accordance with another aspect of the exemplary embodiment, a question answering system for querying a knowledge base includes memory which stores categorization rules for categorizing at least a part of a user's request according to a plurality of different types of information and for mapping the request to an associated knowledge base, the mapping including mapping to a first layer of the knowledge base when a first of the types of information is identified and mapping to second layer of the knowledge base when a second of the types of information is identified. A search engine searches for responsive problem descriptions in the layer of the knowledge base to which the request is mapped. A computer processor implements the categorization rules and search engine.

In accordance with another aspect of the exemplary embodiment, a method for querying a knowledge base includes providing a knowledge base which includes a plurality of layers. Each of the layers corresponds to a different type of information. The layers include a first layer and a second layer. The first layer includes a set of simple solution descriptions. Each of the simple solution descriptions explains how to perform a specific simple action. The second layer includes a set of complex solution descriptions. Each of the complex solution descriptions is linked to a plurality of the simple solution descriptions for performing a complex action. The method includes categorizing at least a part of a user's request according to one of the different types of information, each of the types being associated with a respective layer of the knowledge base. The categorizing includes applying a plurality of categorization rules to the user request. Based on the categorization, the request is mapped to the respective layer of the knowledge base and the respective layer is searched for responsive problem descriptions.

One or more of the categorizing and the mapping of the user's request may be performed with a computer processor.

DETAILED DESCRIPTION

Aspects of the exemplary embodiment relate to systems and methods for generating and using a querying system for querying a knowledge base adapted to differential searching. The system identifies a type of query that is appropriate to the information being sought and generally returns information to the user that is more relevant than would otherwise be achieved.

Figure 1:
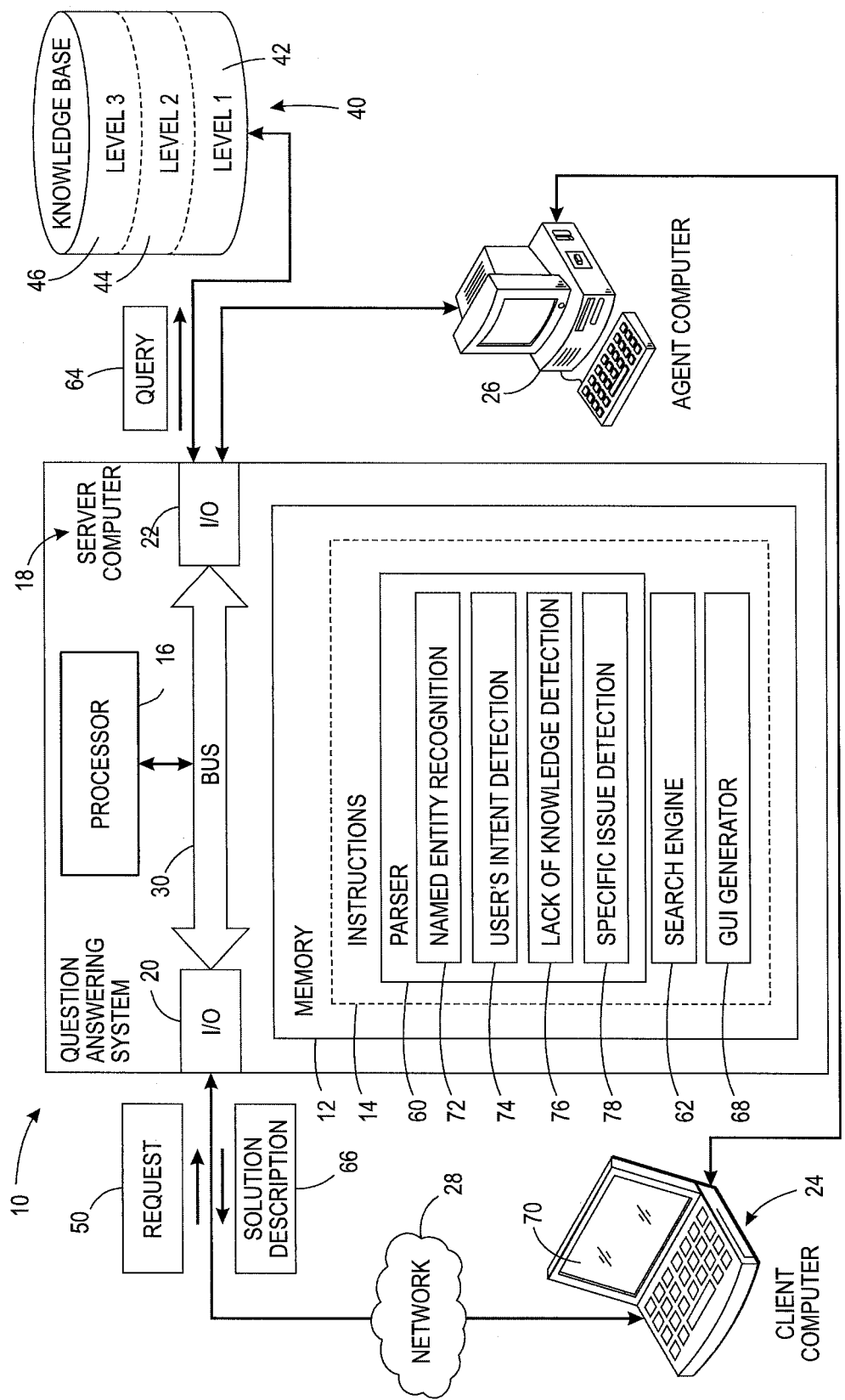
FIG. 1 is a functional block diagram of a question answering system in accordance with one aspect of the exemplary embodiment.

With reference to FIG. 1, an automated system 10 for question answering includes memory 12 which stores instructions 14 for performing the exemplary method and a processor 16 in communication with the memory, which executes the instructions. The system 10 may be hosted by one or more computing devices, such as the illustrated server computer 18. The server computer includes one or more interface devices 20, 22, for communicating with external devices, such as the illustrated client and/or agent computing devices 24, 26, via a wired or wireless network 28, such as a local area network or a wide area network, such as the Internet. Hardware components 12, 16, 20, 22 of the system are communicatively connected via a data/control bus 30.

A knowledge base 40 is stored in memory 12 or in remote memory accessible to the system. Knowledge base 40 stores the knowledge used for question answering and is organized based on layers (levels) 42, 44, 46 of information. Each layer addresses a different type of information, or more specifically, the knowledge to answer a different type of request.

The system 10 receives as input a request 50 from a user seeking an answer to a problem, for example, a problem that the user is experiencing with a device, such as a computer, printer, camera, domestic appliance, vehicle, or the like, or with a service. The user can be a customer, who may be seeking assistance with a specific device, or an agent working in a call center, with whom the customer is interacting by telephone, electronic communication, or other form of communication. The request 50, e.g., in the form of a question, may have been input by the user, e.g., via the client device 24, or by the agent, on the agent device 26. The knowledge base 40 may be specific to the type of device or service that the user's problem relates to and may be arranged in the form of a set of problems, identified causes of those problems, and one or more candidate solutions, which may be simple or complex.

The instructions 14 include a parsing component (parser) 60 which processes the natural language of the user's request 50 to categorize text string(s) of the request according to the type of information being sought. A search engine 62 accesses the knowledge base 40 with a query 64 that is based on the parsed text to retrieve information, such as one or more solution descriptions 66. A graphical user interface (GUI) generator 68 generates a representation of the retrieved solution description(s) for display to the user on a display device 70 of the client computer 24 and/or for review by an agent on the agent device 26.

The parser 60 may implement conventional techniques for segmenting text into sentences and words, identifying parts of speech for the words of the text, and identifying syntactic dependencies between the words. In addition, the parser 60 includes or accesses a named entity recognition component for recognizing named entities 72 in the text of the request, and a plurality of categorizing components 74, 76, 78, which implement categorizing rules (linguistic patterns) for identifying, from the parsed content, three different types of information, where present, related to 1) intent, 2) lack of knowledge, and 3) a specific issue to be resolved. Each of the different types of information, if extracted from the request, is used to search a respective layer of the knowledge base 40 addressing this type of information, at least initially. In this way, the question is not a considered simply as a monolithic block of text that only contains words appearing in a similar way in the solutions detailed in the knowledge base. A mapping between the knowledge base 40 and the request 50 is thus performed by identifying specific sections in the request and searching for a related topic in a specific area of the knowledge base, depending on the topic addressed in each section of the request.

Figure 2:
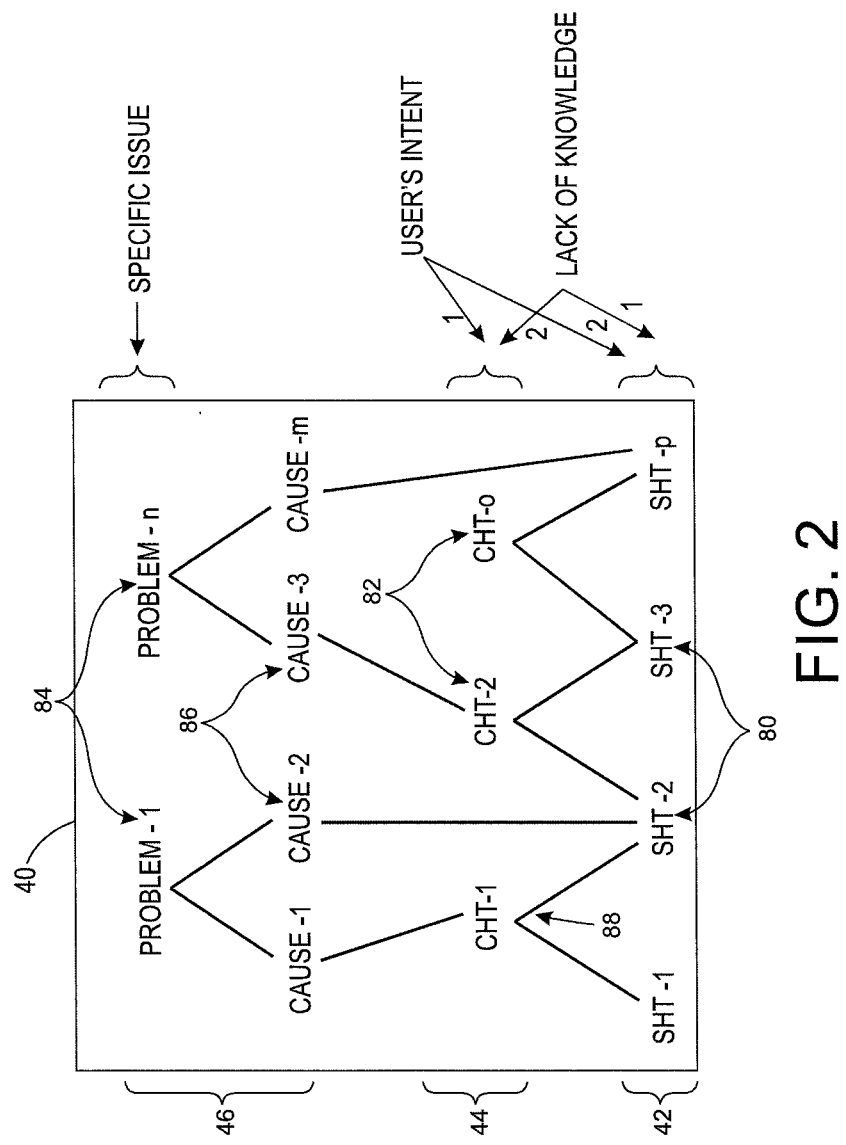
FIG. 2 illustrates configuration of part of the knowledge base for the system of FIG. 1.

With reference to FIG. 2, the exemplary knowledge base 40 is structured to facilitate this mapping. The layers may be arranged as follows:

1. A first layer 42, which includes a set of simple solution descriptions 80 (referred to herein as Simple How To or SHT), each corresponding to a respective problem description. Each SHT solution description explains how to perform a specific simple action through one or more simple steps.

2. A second layer 44, which includes a set of complex solution descriptions 82 (referred to herein as Complex How To or CHT). Each CHT combines two or more simple solution descriptions to perform a complex action which includes a sequence of the simple actions.

3. A third layer 46, which includes a list of problem descriptions 84 (characterized by symptoms) that may each arise from one or several causes 86. Each possible cause can be solved by one or more specific solution descriptions that can each be either simple 80 or complex 82.

As shown in FIG. 2, links 88 join the SHTs 80 and respective CHTs 82 to which they are related, and similarly link the CHTs to the causes 86 to which they are related, and link the causes to the related problem descriptions 84.

At the first, lowest, layer 42, the knowledge base contains the SHT descriptions 80. An SHT 80 is a standard description detailing which step(s) must be done to perform a specific action (e.g., "how to activate the Wi-Fi," "how to install an application of a mobile phone," etc.). The SHTs are maintained as very simple and specific descriptions to explain how to perform one simple action. To assist in SHT retrieval, each SHT 80 may include, e.g., as metadata, a set of keywords and a set of one or more key actions associated with each keyword. The keywords may include named entities (each consisting of a sequence of one or more words recognized as being the name of an item used in the domain). Key actions may be verbs or verb phrases (consisting only of main verbs, auxiliary verbs, and other infinitive or participle constructions). As examples, the following pairs of key action and keyword may be associated with a given SHT: "Select+Network," "Open+Setting Menu."

In the second, higher layer 44, some tasks or complex problems may require a series of sub-tasks to be performed sequentially. For example, a request such as: "I want to install a new application on my phone but it says No more space available. What can I do?" may be best solved with the following sequence of three steps: First uninstall application X, then remove some files, then install Z, . . . ). In such cases, a Complex How-to (CHT) can be stored in the knowledge base, which covers a predefined complex scenario. Each CHT can be encoded as a sequence of SHTs. In the case of a CHT, the metadata need not be simply the addition of metadata of each of the component SHTs. It may further include a description of the intent or problem to be solved, using as many different formulations as possible, in order to provide the search engine 62 with more information about how to describe, and therefore recognize, the intent/problem.

As evident from FIG. 2, each CHT 82 is linked to a plurality of SHTs 80. While two of the CHTs may have one or more of the SHTs in common, for each CHT, at least one of the SHTs is different and/or the order in which the linked SHTs are to be performed is different from each other CHT.

In the highest layer 46 of the knowledge base, there is a set of problem definitions 84. These problem definitions are composed of a series of descriptions related to symptoms that are specific to the problem. Each type of problem may be due to several possible causes 86. Each cause may be linked to a way to solve the problem and therefore either linked directly to an SHT 80 or to a CHT 44.

The illustrated computers 18, 24, 26 may each be a PC, such as a desktop, a laptop, palmtop computer, portable digital assistant (PDA), server computer, cellular telephone, tablet computer, pager, combination thereof, or other computing device capable of executing instructions for performing the exemplary method.

The memory 12 may represent any type of non-transitory computer readable medium such as random access memory (RAM), read only memory (ROM), magnetic disk or tape, optical disk, flash memory, or holographic memory. In one embodiment, the memory 12 comprises a combination of random access memory and read only memory. In some embodiments, the processor 16 and memory 12 may be combined in a single chip. The network interface 20, 22 allows the computer to communicate with other devices 24, 26 via a computer network, such as a local area network (LAN) or wide area network (WAN), or the internet, and may comprise a modulator/demodulator (MODEM) a router, a cable, and and/or Ethernet port. Memory 12 stores instructions for performing the exemplary method as well as the processed data.

The digital processor 16 can be variously embodied, such as by a single-core processor, a dual-core processor (or more generally by a multiple-core processor), a digital processor and cooperating math coprocessor, a digital controller, or the like.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 10. Since the configuration and operation of programmable computers are well known, they will not be described further.

Figure 3:
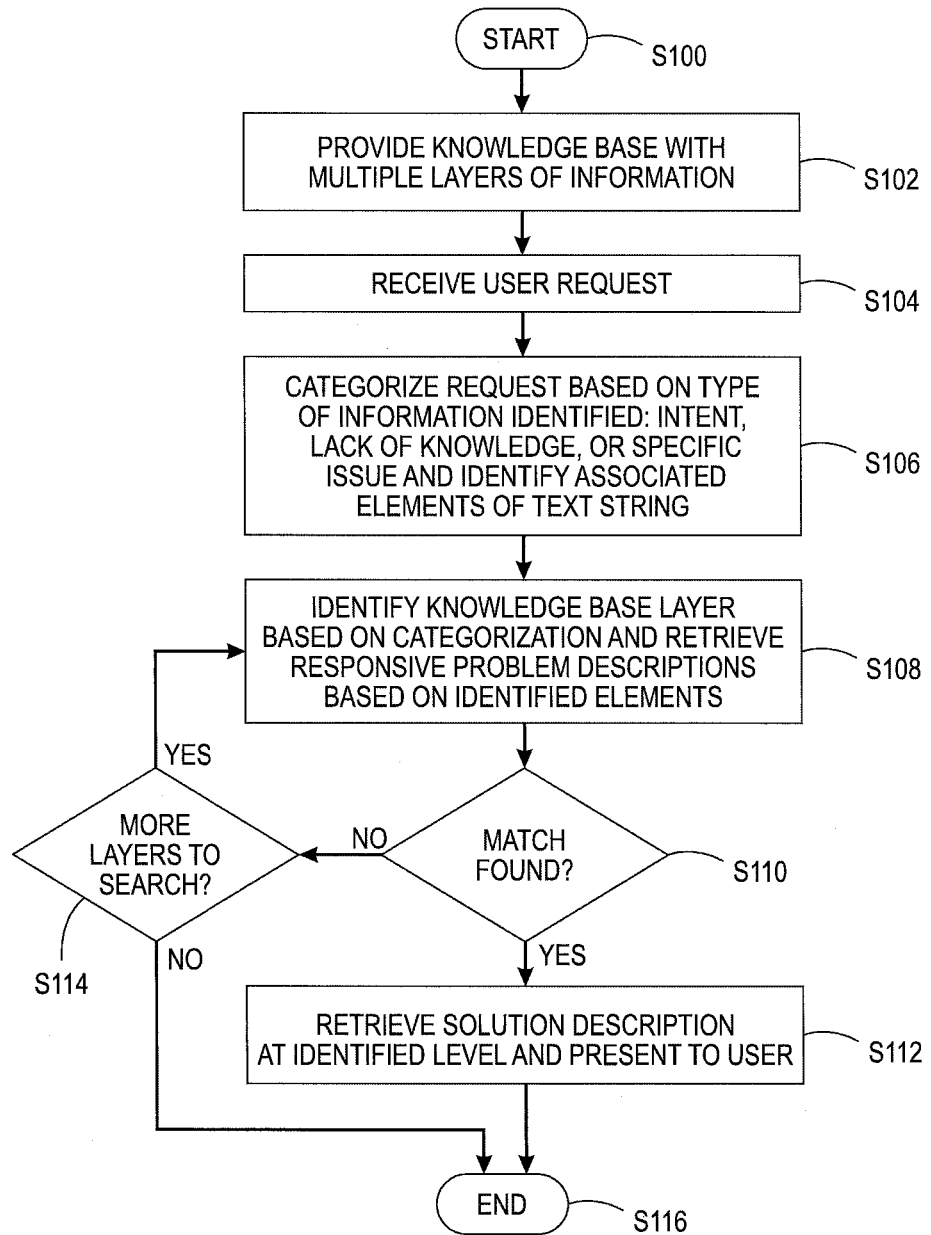
FIG. 3 is a flow diagram illustrating a question answering method in accordance with another aspect of the exemplary embodiment.

FIG. 3 illustrates a method for querying a knowledge base which may be performed with the querying system and knowledge base of FIG. 1.

The method begins at S100.

At S102, a knowledge base 40 is formed as described herein. This step may be performed manually or at least partly automatically.

At S104, a user's request 50 is received by the system 10.

At S106, at least a part of the request is categorized according to one of the predefined types of information. In particular, the request 50 is parsed, by the parser 60 to identify one or more of the different type(s) of information, if present: user intent, lack of knowledge, and specific issue. Elements of the part of the request which are relevant to the type of information identified are also identified.

At S108, the parsed request 50 is mapped to one of the knowledge base layers, which is to be searched by the search engine 62. The layer is identified based on the type of information identified at S106. Identified elements of the request 50 are mapped to metadata of problem descriptions in the selected layer. If at S110, a match in the prescribed layer is found by the search engine, the method proceeds to S112, otherwise to S114.

At S112, if there is a problem description (or descriptions) in the identified layer which matches the elements of the request (e.g., based on the matching metadata), the associated solution description 66 is retrieved and returned to the user, e.g., presented on the display device 70.

If there are no matching problem descriptions at the appropriate layer, the method may include a procedure for selecting a next layer to search. Specifically, at S114, if the procedure identifies a next layer to search, the method returns to S108, where the next layer is searched. If there are no further layers and no solution descriptions have been identified, the agent may be alerted to perform a manual search or to modify the request.

The method ends at S116.

The method illustrated in FIG. 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the method.

As will be appreciated, while the steps of the method may all be computer implemented, in some embodiments one or more of the steps may be at least partially performed manually. Further, the steps of the method need not all proceed in the order illustrated and fewer, more, or different steps may be performed.

Further details of the system and method will now be described.

Analysis of the Request (S106)

The request 50, or each part thereof if, for example, it includes more than one sentence, is analyzed to identify a particular one (or more) type(s) of information being sought and elements of the request that are to be used for searching the respective knowledge base layer. Categorization rules for identifying the type of information being sought are based on a sub-set of element classes to which elements identified in the request are to meet and, optionally, the sequence in which these elements are to appear in the sentence. From the identified type of information, the layer which is to be searched (and/or a rule which prescribes the order of search) is identified.

As used herein, an element is a term (e.g., a word or phrase) which is tagged with one of a predefined set of classes of elements, such as Action, Named Entity, and the like. An Action is a verb from a predefined set of verb and verb phrases related to an action. In the case of mobile phones, for example, Actions may include verbs such as activate, push, close, launch, etc. A Named Entity is a word or phrase which is the name of an object in the domain of application of the knowledge base, and may be identified from a predefined list of domain-related named entities. For example, for mobile phones, named entities may include: Wi-Fi, application, Google maps, email, email settings, etc.

Categorization rules are defined in terms of a set or sequence of element classes which have to be met by the elements in a text string in order for the rule to be met. The rules may require that some or all of the identified elements are in a syntactic dependency or dependencies with others of the elements in the prescribed element classes. Syntactic dependencies define grammatical relationships between pairs of elements, such as the relationship between a subject of the sentence and its associated verb, the relationship between an object of the sentence and its associated verb, and the like.

The exemplary parser 60 takes a text string, such as a sentence, paragraph, or even a sequence of a few words as input (here, a request 50) and breaks each sentence into a sequence of tokens (linguistic elements) and associates information with these. The parser may provide this functionality by applying a set of parser rules, called a grammar, dedicated to a particular natural language such as French, English, or Japanese. The grammar is written in a formal rule language, and describes the word or phrase configurations that the parser tries to recognize. The basic rule set used to parse basic documents in French, English, or Japanese is called the "core grammar." Through use of a graphical user interface, a grammarian can create new rules to add to such a core grammar. In some embodiments, the syntactic parser employs a variety of parsing techniques known as robust parsing, as disclosed, for example, in Salah Aït-Mokhtar, et al., "Incremental Finite-State Parsing," Proc. 5th Conf. on Applied Natural Language Processing (ANLP'97), pp. 72-79 (1997); Salah Aït-Mokhtar, et al., "Subject and Object Dependency Extraction Using Finite-State Transducers," Proc. 35th Conf. of the Association for Computational Linguistics (ACL'97) Workshop on Information Extraction and the Building of Lexical Semantic Resources for NLP Applications, pp. 71-77 (1997); Salah Aït-Mokhtar, et al., "Robustness beyond shallowness: incremental dependency parsing," in special issue of the NLE Journal (2002); Caroline Brun, et al., "Normalization and paraphrasing using symbolic methods" ACL: Second International workshop on Paraphrasing, Paraphrase Acquisition and Applications, Sapporo, Japan, (2003); Caroline Brun, "Detecting Opinions Using Deep Syntactic Analysis," Proc. Recent Advances in Natural Language Processing (RANLP), Hissar, Bulgaria (2011), hereinafter, "Brun 2011"; and U.S. Pat. No. 7,058,567; issued Jun. 6, 2006, entitled NATURAL LANGUAGE PARSER, by Aït-Mokhtar, et al.

In one embodiment, the syntactic parser 60 may be based on the Xerox Incremental Parser (XIP), which may have been enriched with additional processing rules to facilitate the processing of the request 50. Other natural language processing or parsing algorithms can alternatively be used.

The exemplary incremental parser 60 performs a pre-processing stage which handles tokenization, morphological analysis and part of speech (POS) tagging. Specifically, a preprocessing module of the parser breaks the input text into a sequence of tokens, each generally corresponding to a text element, such as a word, or to punctuation. Parts of speech are identified for the text elements, such as noun, verb, etc. Some tokens may be assigned more than one part of speech, and may later be disambiguated, based on contextual information. The tokens are tagged with the identified parts of speech (POS), such as noun, verb, adverb, etc. A surface syntactic analysis stage performed by the parser includes chunking the input text to identify groups of words, such as noun phrases and verb phrases. Then, syntactic relations (dependencies) are extracted, in particular, the relations relevant to the exemplary request analysis.

The exemplary parser is configured for identifying elements in specific classes, such as named entities and action verbs, where they appear in the text and for applying the categorization rules which specify which of a subset of the element classes must be present.

The parser extracts named entities related to the domain, for example with the named entity recognition component 72. Methods for detection of named entities which may be used herein are described, for example, in Caroline Brun, et al., "A hybrid system for named entity metonymy resolution," 3rd Language & Technology Conference, Poznan, Poland, pp. 87-110 (October, 2007); U.S. Pat. No. 7,171,350, entitled METHOD FOR NAMED-ENTITY RECOGNITION AND VERIFICATION, by Lin, et al.; U.S. Pat. No. 6,975,766, entitled SYSTEM, METHOD AND PROGRAM FOR DISCRIMINATING NAMED ENTITY, by Fukushima; U.S. Pat. No. 6,311,152, entitled SYSTEM FOR CHINESE TOKENIZATION AND NAMED ENTITY RECOGNITION, by Bai, et al.; U.S. Pat. No. 6,263,335, entitled INFORMATION EXTRACTION SYSTEM AND METHOD USING CONCEPT-RELATION-CONCEPT (CRC) TRIPLES, by Paik, et al.; U.S. Pub. No. 20080319978, published Dec. 25, 2008, entitled A HYBRID SYSTEM FOR NAMED ENTITY RESOLUTION, by Caroline Brun, et al.; U.S. Pub. No. 20090204596, published Aug. 13, 2009, entitled SEMANTIC COMPATIBILITY CHECKING FOR AUTOMATIC CORRECTION AND DISCOVERY OF NAMED ENTITIES, by Caroline Brun, et al.; and U.S. Pub. No. 20100082331, published Apr. 1, 2010, entitled SEMANTICALLY-DRIVEN EXTRACTION OF RELATIONS BETWEEN NAMED ENTITIES, by Caroline Brun, et al.

The exemplary parser 60 seeks to detect components of the user's question, each relating to one of the different types of information, where they appear in the text. The following information types may be recognized: 1. the user's intent; 2. a lack of knowledge; and 3. a specific issue. The exemplary NLP parser 60 is configured for detection of the components of the request corresponding to each of these information types using the set of categorization rules. Each rule defines a set of element classes from which elements in those classes are to be identified in the text string in order for the rule to fire (i.e., to be met). Exemplary categorization rules may be as follows:

1. User's Intent

The intent detection component 74 of the parser is configured with categorization rules for detecting sentences and shorter text strings where the user writes using either the first person singular or plural. More specifically, text strings, such as sentences, with the following structure are identified:

A. $1^{st}$ person sing./pl.+Willingness Verb+Action+Named Entity

B. $1^{st}$ person sing./pl.+Negation+Action+Named Entity

The Named Entity and Action classes are as discussed above. In English, the element in the $1^{st}$ person sing./pl. class is either "I" or "we". A Willingness Verb is a verb from a predefined set of verb and verb phrases related to willingness, such as want, try, "would like to" etc. Negation is a word or phrase, such as a modal verb, from a predefined set of negation terms which negates a subsequent verb or verb phrase. Examples include can't, don't, refuse, etc. Required syntactic dependencies between the elements may include that the person speaking is the subject of the Willingness and/or Action verb and the named entity is the object of the Willingness and/or Action verb.

The goal is this step is to extract specific elements in sentences that will be used to search the content of the knowledge base in the appropriate layer. The following examples of the processing of such sentences illustrate a) the elements initially extracted (the classes for these extracted element being noted in parenthesis), and b) those of the extracted elements which are retained, for the information type User Intent, to be used for searching the knowledge base, in the example case of mobile phones:

1) "I want to active the WiFi on . . . ,"→
  a) I ($1^{st}$ person sing.)+want (willingness verb)+activate (Action)+Wi-Fi (Named Entity)→
  b) User Intent: activate (Action)+Wi-Fi (Named Entity)
2) "I was trying to send emails"→
  a) I ($1^{st}$ person sing.)+send (Action)+email (Named Entity)→
  b) User Intent: send (Action)+email (Named Entity)
3) "I can't configure my email settings"→
  a) I ($1^{st}$ person sing.)+cannot (negation)+configure (Action)+email settings (Named Entity)→
  b) User Intent: configure (Action)+email settings (Named Entity)

In tagging the elements relating to user's intent, several of the tags, such as for the $1^{st}$ person sing./pl., willingness verbs, and Negation terms need not be retained, once the User Intent rule has fired, as they will not be used to search the knowledge base. For the other elements (here, Action verbs and Named Entities), the surface form (as it appears in the sentence) is mapped to the corresponding root (lemma) form. The retained tags for sentence 3) are for the elements configure (this is the root form of the element configure, and is classed as an Action) and email settings (this is the root form of email settings, which is classed as Named Entity, as it is among the list of Named Entities). Additionally, the sentence is tagged as information relating to User Intent.

Any other remaining Action verbs and Named Entities (other than the main ones directly connected to the subject of the sentence, which appear in a sentence tagged as User's Intent), may be labeled as User's Intent auxiliary information and retained as disambiguating context.

2. Lack of Knowledge

The lack of knowledge detection component 76 is configured for detecting whether the request relates to a lack of knowledge of the user. This is component applies categorization rules for detecting the difference between a question related to a real problem (something that does not work) and a lack of knowledge of the user which prevents him from doing what he wants to do (which is an easier question to answer and therefore to automate).

To detect sentences which relate to a lack of knowledge, the same type of analysis may be applied as is performed for identifying user intent, but in this case the following sub-sets of the classes of elements may be searched for in sentences of the request:

C. A Question not making a direct reference to an issue (problem)+an Action+a Named Entity D. A Knowledge Verb+an Action+a Named Entity In rule C., a question that does not make a direct reference to an issue refers to a sentence that contains a question pronoun selected from a predefined set of question pronouns such as What, Where, When, Who, Why, Which How, etc. (sometimes referred to as relative pronouns) and which does not contain words related to a problem, selected from a predefined set of problem-related words, such as: issue, problem, broken, fix, etc. In one embodiment, the detection of "problem references" (which is comparable to negative sentiment detection) can use methods described in Brun 2011. In rule D., a Knowledge Verb is a verb from a predefined set of verb and verb phrases related to Knowledge, such as know, find, locate, discover, etc.

Examples of such sentences, a) the information extracted for the rule to fire, and b) the retained information tagged with Lack of Knowledge, are as follows:

4) How can I activate WiFi?→
  a) How (question pronoun, no associated problem)+activate (Action)+Wi-Fi (Named entity)→
  b) Lack of Knowledge: activate (Action)+Wi-Fi (Named entity)

5) Where can I find the call logs?→
  a) Where (relative pronoun, no associated problem)+find (Action)+call logs (Named Entity)→
  b) Lack of Knowledge: find/locate (Action)+call logs (Named entity)

6) What am I supposed to do to connect to the Internet?→
  a) What (relative pronoun, no associated problem)+connect (Action)+Internet (Named Entity)→
  b) Lack of Knowledge: connect (Action)+Internet (Named entity)

Once again, those elements that will be used for searching the knowledge base are retained in the final output, while tags for other elements, such as question terms, are not retained, at least for the initial search. Any other remaining Action verbs and related Named Entities (other than those related to the main one) appearing in the sentence may be tagged as Lack of Knowledge auxiliary information and kept as disambiguating context.

Additionally, as exemplified in example 5, the parser may access a list of synonyms which lists terms appearing in the knowledge base that are considered similar to the element in the request (such as locate=find), for expanding the scope of the search in the knowledge base.

3. A Specific Issue

The issue detection component 78 includes rules for detection of a sentence relating to a specific issue. The following sub-sets of classes of elements may be searched for in sentences:

E. $1^{st}$ person singular/plural+Negation+Action+Named Entity

F. (Indefinite $3^{rd}$ person singular OR Named Entity)+Negation+Action

G. (Indefinite $3^{rd}$ person sing. OR Named Entity)+term(s) related to a specific issue (problem)

In rules E and F, elements relating to Negation are simply tagged as Negation, and can be mapped to any one of a set of negation elements in the knowledge base.

Rule E, involving the $1^{st}$ person, is similar Rule B of user intent. Here, however, the Negation element is retained for searching the knowledge base and introduces the idea that despite the user's intent, it does not work. A given sentence can be tagged both as a user's intent and as a specific issue, if this is the case. As an example:

7) I cannot activate the Bluetooth→
  a) I ($1^{st}$ person singular)+cannot (Negation)+activate (Action)+Bluetooth (Named Entity)→
  b) Specific Issue: Negation+activate (Action)+Bluetooth (Named Entity)
  b) User's Intent: activate (Action)+Bluetooth (Named Entity)

Rule F is more specific to an issue as it is a pattern for capturing that "something that does not perform as expected." In this case, the detection of an indefinite pronoun ($3^{rd}$ person singular, e.g., it) allows detection of what is not working. The issue detection component 78 may employ rules for solving coreference in order to associate the pronoun with the Named Entity to which it refers (see, for example, F. Trouilleux, "Coreference Resolution Evaluation Based on Descriptive Specificity," Proc. 2nd Intern'l Conf. on Language Resources and Evaluation (LREC 2000), Athens, Greece (2000). An example of a sentence meeting this rule is:

8) The Google Map refuses to start→
  a) Google map (Named Entity)+refuses (Negation)+start (Action)→
  b) Specific Issue: Google map (Named Entity)+Negation+start (Action)

The example 8) sentence could also be It refuses to start, with It being replaced, in the analysis, with Google Map, through coreference resolution, based on an earlier part of the request (e.g., using a sentence such as My question is about Google Map.)

Rule G is based on the detection of one of a predetermined set of words related to an issue (problem), such as: issue, problem, broken, fix, etc., as described above. In some embodiments, the detection of "problem references" (or negative sentiment detection) can employ methods described in Brun 2011 and in Gavriel, M., Master of Science Thesis, University of Edinburgh, "Capturing negation in question answering systems," pp. 1-92 (2005). As an example, the rule would read on a sentence such as:

9) I am trying to send an email but it fails to be delivered→
  a) Email (Named Entity)+fail+deliver→
  b) Specific Issue: Email (Named Entity)+fail+deliver Any other remaining Action verbs and Named Entities (other than the main one directly connected to the subject of the sentence) appearing in the sentence are tagged as Specific Issue auxiliary information and retained as disambiguating context.

Step S106 can be performed in stages. In a first step, the various elements to be used in the categorization rules are labeled when they appear in the request. These elements may include elements in some or all of the following lists for the respective element classes:

1. A list of Named Entities
2. A list of Action verbs
3. A list of Willingness verbs
4. A list of Negation elements
5. A list of occurrence of $1^{st}$ person singular or plural
6. A list of $3^{rd}$ person singular
7. A list of Question words
8. A list of Problem elements Once these elements are identified, if they appear, the rules can be applied to determine whether any of them fire on the set of elements identified in a given sentence. Depending on the rules that fire, sentences in the request can be tagged at the level of information type to provide:
1. A list of user's intents,
2. A list of lack of knowledge, and
3. A list of specific issues, each linked to the retained elements which are to be used in searching the knowledge base (root forms of Action verbs and Named Entities, and their synonyms, as well as Negation, and optionally, problem elements).

As will be appreciated, some sentences may receive none of these component tags while others may receive one or in some cases, more than one component tags.

Mapping Between the Request and Knowledge Base Content (S108)

The mapping differs, depending on the component(s) with which the sentence(s) of the request is/are tagged. The following rules may be implemented:

If a sentence of the user's request has been tagged with a rule related to a lack of knowledge, then the following procedure may be implemented:
1. Search for a match between the elements defined in the lack of knowledge component (Action+Named Entity) and the elements (key actions, keywords) in the meta-data of the SHTs.
    a. If there is a match, then return matching SHTs, otherwise,
    b. If no match is found in the SHT layer, search for a match in the CHT layer.
        i. If there is a match, then return matching CHTs, otherwise,
        ii. if no match is found, use the matching method based on User Intent If the user's request has been tagged with a rule related to a User's Intent, then the following procedure may be implemented:
2. Search for a match between the elements defined in the User's Intent (Action+Named Entity) and the elements in meta-data of the CHTs.
    a. If there is a match, then return matching CHTs, otherwise,
    b. if no match is found in the CHT layer, search for a match in the SHT layer.
        i. If there is a match, then return matching SHTs, otherwise,
        ii. if no match is found, use the matching method based on Specific Issue.

If the user's request has been tagged with a rule related to a Specific Issue, then the following procedure may be implemented:
3. Search for a match between the elements defined in the Specific Issue (Action+Named Entity/Problem Term) and the elements in Problem definitions.
    a. If there is a match, then return matching Problem definitions, otherwise,
    b. if no match is found, then perform standard keyword based search on the full content of the knowledge base using, for example, the full list of Action verbs and Named Entities extracted from the user's request.

Thus, it can be seen that the information returned at S112 differs, depending on both the type of information (component) and the elements identified in the user's request. FIG. 2 illustrates the parts of the knowledge base searched and the order for each of the three components.

The exemplary system and method thus enable differential searches to be performed, based on a user's request. The method is facilitated by providing a specific organization of the knowledge inside the knowledge base 40 based on layers of information. Each layer addresses a different type of information or more specifically the knowledge to answer a different type of question. The exemplary method then analyzes the content of a user's request 50 to isolate three different types of information: Intent, Lack of Knowledge, Specific Issue, where present. Then, based on the type of information identified, the method is able to use each different type of information extracted from the request to search specific parts of the knowledge base addressing this type of information.

The exemplary system and method find application in a range of question answering systems. In the event that the automated method does not retrieve useful information, an agent familiar with the knowledge base may perform one or more additional searches of the knowledge base using conventional searching techniques. The method can thus be used to help agents to find a solution to a user's request more rapidly. It can be used to complement other methods by improving and automating the process, at least partially. This can reduce the time an agent may take to search the knowledge base and/or retrieve more useful information. It is therefore particularly useful in the customer care business.

In summary, the exemplary knowledge base is structured in problems, causes, "Simple How To" descriptions (SHT) and "Complex How To" descriptions (CHT). In addition, the system detects a user's intention, whether there is lack of knowledge about the topic in question, and what are the issues in the query. The system then maps the request to the content of the knowledge base, which can be achieved with the following steps: 1) relate the detection of lack of knowledge to SHTs and if that is not possible to CHTs; 2) if step (1) does not give any matches, relate the detection of user's intent to CHTs and if that is not possible to SHTs, 3) if step 2) does not return any matches, try to match issues to problem descriptions; and 4) if none of the above works, perform a keyword search.

EXAMPLE

The following example illustrates how the method is applied to a request. Given the following request:

I have installed IOS7 on my I-Phone. I want to remove application still running in background, but when I press my finger on these applications I don't see appearing as before the red cross icon to end them. Does someone know how to terminate applications running in background in IOS7?

The following information is extracted from the request by the parser:
1. Named Entities+Actions:
    a. Install+IOS7
    b. I-Phone
    c. Remove+application
    d. Application+running
    e. Press+finger
    f. Appear+red cross icon
    g. End+application
    h. Terminate applications
    i. IOS7
2. User's Intent
    UI-1: remove+application+(run+background)
3. Specific Issue
    SI-1: Negation+appear+red cross icon+(end+application)

4. Lack of Knowledge
   LoK-1: terminate+application+(run+background+IOS7)

The terms in brackets are the auxiliary information extracted from the same sentence. Then, as there is a Lack of Knowledge expressed in the request, the elements in LoK-1 will be used to find a match with the How To section in the knowledge base (looking first to the SHTs and then to the CHTs if no match is found in the metadata of the SHTs), for information explaining how to terminate applications running in background in the new operating system IOS7. As there is also a User's Intent and Specific Issue identified, these may also form the basis of a search, but the results may be ranked lower than for the Lack of Knowledge so that the user may view these results if the Lack of Knowledge results are not useful. As will be appreciated, in a given request, fewer than all components may be identified.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for querying a knowledge base, comprising:
providing a knowledge base which includes a plurality of layers, each layer corresponding to a different type of information, a first of the layers comprising a set of simple solution descriptions, each explaining how to perform a specific simple action, and a second of the layers comprising a set of complex solution descriptions, each including a sequence of two or more of the simple solution descriptions to perform a complex action;
providing a question answering system which includes categorization rules for categorizing at least a part of a user's request according to the types of information and for mapping the request to the knowledge base, the mapping including mapping to a first of the knowledge base layers when a first of the types of information is identified and mapping to a second of the knowledge base layers when a second of the types of information is identified;
receiving a user's request;
categorizing at least a part of the user's request with the categorization rules;
mapping the user's request to one of the layers of the knowledge base, based on the categorization; and
searching for responsive problem descriptions in the one of the layers;
wherein at least one of the categorizing and the mapping of the user's request is performed with a computer processor.

2. The method of claim 1, wherein the plurality of layers comprises three layers and wherein the mapping the part of the request to the knowledge base comprises mapping to a third of the layers when a third of the types of information is identified.

3. The method of claim 1, further comprising identifying elements in the user request which are in a predefined set of element classes and wherein the each of the categorization rules identifies a subset of the element classes which are to be found in a text string for the rule to be met.

4. The method of claim 3, wherein the element classes are selected from the group consisting of: named entities; action verbs; willingness verbs; negation elements; first person singular or plural; third person singular; Question words; and problem elements.

5. The method of claim 4, wherein the set of element classes include named entities and action verbs.

6. The method of claim 3, wherein each of the element classes is associated with a list of elements which are in the class.

7. The method of claim 3, wherein each rule requires at least two of the elements in the subset of element classes to be in a predefined syntactic dependency.

8. The method of claim 1 wherein the types of information comprise types of information selected from the group consisting of:
user's intent;
lack of knowledge; and
specific issue.

9. The method of claim 1, wherein one of the types of information relates to a user's intent and the categorization rules include at least one of:
a rule which is met by a sentence which includes elements in the classes: $1^{st}$ person singular or plural, Willingness verb, Action, and Named Entity; and
a rule which is met by a sentence which includes elements in the classes: $1^{st}$ person singular or plural, Negation, Action, and Named Entity.

10. The method of claim 9, wherein when of the rules relating to user's intent is met, the elements in the element classes Action and Named entity are used to search metadata of solution descriptions in the second of the layers and if no matching solution descriptions are found, the elements in the element classes Action and Named entity are used to search metadata of solution descriptions in the first of the layers.

11. The method of claim 1, wherein a third of the layers includes a set of problem descriptions linked to at least one cause, and wherein each of the at least one cause is linked to one or more of solution descriptions selected from the complex solution descriptions and the simple solution descriptions.

12. The method of claim 1, wherein the first type of information is related to lack of knowledge and the second type of information is related to a user's intent.

13. A computer program product comprising a non-transitory recording medium storing instructions, which when executed on a computer, cause the computer to perform the method of claim 1.

14. A system comprising instructions for performing the method of claim 1, and a processor in communication with the memory for executing the instructions.

15. A method for querying a knowledge base, comprising:
providing a knowledge base which includes a plurality of layers, each layer corresponding to a different type of information;
providing a question answering system which includes categorization rules for categorizing at least a part of a user's request according to the types of information and for mapping the request to the knowledge base, the mapping including mapping to a first of the knowledge base layers when a first of the types of information is identified and mapping to a second of the knowledge base layers when a second of the types of information is identified, wherein one of the types of information relates to lack of knowledge and the categorization rules include at least one of:
a rule which is met by a sentence which includes elements in the classes: Question not making a direct reference to an issue, Action, and Named Entity; and a rule which is met by a sentence which includes elements in the classes: Knowledge Verb, Action, and Named Entity;

receiving a user's request;

categorizing at least a part of the user's request with the categorization rules;

mapping the user's request to one of the layers of the knowledge base, based on the categorization; and searching for responsive problem descriptions in the one of the layers;

wherein at least one of the categorizing and the mapping of the user's request is performed with a computer processor.

16. The method of claim 15, wherein when of the rules relating to lack of knowledge is met, the elements in the classes Action and Named entity are used to search metadata of solution descriptions in the first of the layers and if no matching solution descriptions are found, the elements in the classes Action and Named entity are used to search metadata of solution descriptions in the second of the layers.

17. The method of claim 15, wherein the first of the layers comprises a set of simple solution descriptions, each explaining how to perform a specific simple action, and wherein the second of the layers comprises a set of complex solution descriptions, each including a sequence of two or more of the simple solution descriptions to perform a complex action.

18. A method for querying a knowledge base, comprising:

providing a knowledge base which includes a plurality of layers, each layer corresponding to a different type of information;

providing a question answering system which includes categorization rules for categorizing at least a part of a user's request according to the types of information and for mapping the request to the knowledge base, the mapping including mapping to a first of the knowledge base layers when a first of the types of information is identified and mapping to a second of the knowledge base layers when a second of the types of information is identified;

receiving a user's request;

categorizing at least a part of the user's request with the categorization rules, one of the types of information relating to a specific issue and the categorization rules including at least one of:

a rule which is met by a sentence which includes elements in the classes: $1^{st}$ person singular or plural, Negation, Action, and Named Entity;

a rule which is met by a sentence which includes elements in the classes: third person singular or Named Entity, Negation, and Action; and a rule which is met by a sentence which includes elements in the classes: third person singular or Named Entity and a term related to a specific issue;

mapping the user's request to one of the layers of the knowledge base, based on the categorization; and searching for responsive problem descriptions in the one of the layers;

wherein at least one of the categorizing and the mapping of the user's request is performed with a computer processor.

19. The method of claim 18, wherein when of the rules relating to a specific issue is met, the elements in the classes Action and Named entity are used to search metadata of solution descriptions in a third of the layers.

20. A question answering system for querying a knowledge base, comprising:

memory which stores categorization rules for categorizing at least a part of a user's request according to a plurality of different types of information and for mapping the request to an associated knowledge base, the mapping including mapping to a first layer of the knowledge base when a first of the types of information is identified and mapping to second layer of the knowledge base when a second of the types of information is identified, a first of the layers comprising a set of simple solution descriptions, each explaining how to perform a specific simple action, and a second of the layers comprising a set of complex solution descriptions, each including a sequence of two or more of the simple solution descriptions to perform a complex action;

a search engine which searches for responsive problem descriptions in the layer of the knowledge base to which the request is mapped;

a computer processor which implements the categorization rules and search engine.

21. A method for querying a knowledge base, comprising:

providing a knowledge base which includes a plurality of layers, each layer corresponding to a different type of information, the layers including a first layer which includes a set of simple solution descriptions, each explaining how to perform a specific simple action, and a second layer which includes a set of complex solution descriptions, each linked to a plurality of the simple solution descriptions for performing a complex action;

categorizing at least a part of a user's request according to one of the different types of information, each type being associated with a respective layer of the knowledge base, the categorizing including applying a plurality of categorization rules to the user request;

based on the categorization, mapping the request to the respective layer of the knowledge base; and searching for responsive problem descriptions in the respective layer;

wherein at least one of the categorizing and the mapping of the user's request is performed with a computer processor.

* * * * *